United States Patent [19]

Herb

[11] Patent Number: 4,669,935

[45] Date of Patent: Jun. 2, 1987

[54] EXPANSION DOWEL ASSEMBLY

[75] Inventor: Armin Herb, Peissenberg, Fed. Rep. of Germany

[73] Assignee: Hilti Aktiengesellschaft

[21] Appl. No.: 799,944

[22] Filed: Nov. 20, 1985

[30] Foreign Application Priority Data

Nov. 20, 1984 [DE] Fed. Rep. of Germany ....... 3442384

[51] Int. Cl.$^4$ ............................................. F16B 13/04
[52] U.S. Cl. ....................................... 411/39; 411/40; 411/78; 411/61; 405/259
[58] Field of Search ...................... 411/39, 40, 42, 47, 411/55, 51, 61, 63, 64, 71, 74, 75–80, 446, 447, 449, 456; 403/370, 369; 405/259

[56] References Cited

U.S. PATENT DOCUMENTS

| | | | |
|---|---|---|---|
| 3,427,919 | 2/1969 | Lerich | 411/39 |
| 3,802,311 | 4/1974 | Ziegler | 411/76 |
| 3,844,194 | 10/1974 | Reinwall, Jr. | 411/76 |
| 4,156,381 | 5/1979 | Schiefer | 411/40 |
| 4,464,076 | 8/1984 | Leighard | 411/78 |

FOREIGN PATENT DOCUMENTS

| | | |
|---|---|---|
| 40300 | 11/1981 | European Pat. Off. . |
| 1625332 | 4/1970 | Fed. Rep. of Germany . |
| 2729828 | 1/1978 | Fed. Rep. of Germany . |
| 2637350 | 2/1978 | Fed. Rep. of Germany . |
| 596461 | 3/1978 | Switzerland . |
| 809987 | 3/1959 | United Kingdom ................. 411/76 |

Primary Examiner—Thomas J. Holko
Assistant Examiner—Neill Wilson
Attorney, Agent, or Firm—Toren, McGeady and Goldberg

[57] ABSTRACT

An expansion dowel assembly is made up of an axially elongated generally cylindrically shaped dowel body and at least one wedge-shaped expansion member formed monolithically with the dowel body. The dowel body has a first or leading end which is inserted first into a borehole within which the dowel body is to be anchored and an opposite second end. A severable web connects the expansion member to the first end of the dowel body. Before insertion into a borehole, the expansion member projects outwardly from the exterior surface of the dowel body. When the expansion dowel assembly is inserted into a borehole, the web is broken and the expansion member, now separated from the dowel body, is displaced away from the first end within a wedge-shaped recess in the exterior surface of the dowel body. When a load is attached to the trailing end of the dowel body tending to move it opposite to the insertion direction, the expansion member becomes wedged between the borehole surface and the base of the recess in the dowel body.

7 Claims, 2 Drawing Figures

EXPANSION DOWEL ASSEMBLY

BACKGROUND OF THE INVENTION

The present invention is directed to an expansion dowel assembly to be anchored in a borehole in a receiving material and is made up of a dowel body and one or a number of wedge-shaped expansion members. Means for applying a load are located at the trailing end of the dowel body relative to the direction in which it is inserted into a borehole. Wedge-shaped recesses are formed in the circumferential surface of the dowel body adjacent its leading end for receiving the expansion members. The bases of the recesses are inclined inwardly from the leading end of the dowel body toward the axis thereof. Each of the one or more expansion members is connected by a web to the dowel body and the web is severed or broken when the dowel assembly is inserted into the borehole.

In a known expansion dowel, the dowel body is rod-shaped and includes a wedge-shaped expansion member. The wedge-shaped expansion member is positioned within a wedge-shaped recess in the dowel body and is connected with the dowel body by a severable web located at the base of the recess. In a space between the base of the recess and the expansion member, a severing member is positioned in the form of a trapezoidally-shaped plate and extends outwardly beyond the circumferential contour of the dowel body. To install this known expansion dowel, it is driven into a borehole and the severing member, because it extends beyond the circumferential surface of the dowel body and abuts against the surface of the borehole, moves against the web and severs it. When the expansion dowel has reached a sufficient depth in the borehole, the dowel body is pulled opposite to the insertion direction by applying a load and the wedge-shaped expansion member anchors the dowel body in the borehole.

The need for a severing member for cutting the web has proved to be disadvantageous in such an expansion dowel, since in addition to the effort required to place the dowel there is the problem of correct and secure positioning of the severing member. Moreover, the severing member, projecting outwardly from the dowel body, considerably increases the resistance of he expansion dowel to being inserted into a borehole.

SUMMARY OF THE INVENTION

Therefore, the primary object of the present invention is to provide an expansion dowel assembly characterized by a simple insertion procedure and an ability to lock the dowel body in the borehole. The expansion dowel assembly has a simple structure, it does not involve any problems when it is placed in a borehole, and it does not increase the resistance of the assembly to being driven into a borehole.

In accordance with the present invention, a web holds the expansion member in a position projecting outwardly from the circumferential periphery of the dowel body with the web securing the leading end of the dowel body and the expansion members together.

With the expansion members projecting outwardly from the circumferential periphery of the dowel body, the expansion members contact the opening into the borehole at the commencement of the insertion procedure, so that the driving-in force applied to the dowel body causes the webs to be broken or severed. With further insertion of the dowel body, recesses in the dowel body present an increasing depth for the expansion members which are displaced into the recesses and then are carried along in the insertion direction by the dowel body. The expansion members seated within the recesses do not offer any appreciable resistance to the insertion of the assembly into the borehole. Subsequently, when a load is applied to the dowel body acting in the direction opposite to the insertion direction, the expansion members become wedged between the dowel body and the borehole surface, anchoring the dowel body in place.

The placement of the webs at the leading ends of the dowel body and the expansion members facilitates the insertion of the dowel assembly into a borehole with the webs preventing the expansion members from extending forwardly of the dowel body. Further, the webs can be made resistant to bending so that the expansion members without any additional radial support are maintained in a position projecting outwardly from the lateral surface of the dowel body so that the severing procedure can be effected. Accordingly, it is possible to fabricate the expansion dowel assembly monolithically from a single piece of sheet metal so that material and machining costs are limited. Moreover, with a monolithic construction assembly of separate dowel parts is not necessary as in known expansion dowel assemblies.

Means are provided on the dowel body for applying a load and such means can be in the form of an external thread at the trailing end of the dowel body. To prevent any weakening in the cross-section of the dowel body due to the external thread, the dowel body, preferably formed as a tubular member, is provided in the region of the external thread with inwardly folded parts. Accordingly, reinforcing ribs are formed oriented in the direction of the dowel axis. Furthermore, the base of the recesses are inclined inwardly from the leading end of the dowel body. Accordingly, the expansion members can be displaced inwardly into the recesses during installation and before the web is broken so that the web serves as a pivot point. Subsequently, as described above, the webs are broken due to the projection of the expansion members from the dowel body as the dowel body is inserted further into the borehole while carrying the expansion members along with it in the recesses. In this manner the expansion members are accurately guided by the recesses during the insertion of the expansion dowel assembly.

The use of the web as a bending member is particularly advantageous in the production of the assembly. The web is especially suitable as a pivot point for the expansion members with the web being bent through approximately 180°.

In a preferred embodiment of the invention three equiangularly spaced recesses and expansion members are provided around the circumferential periphery of the dowel body so that a uniform distribution of the anchoring forces is afforded and high anchoring values are achieved.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figure 1:
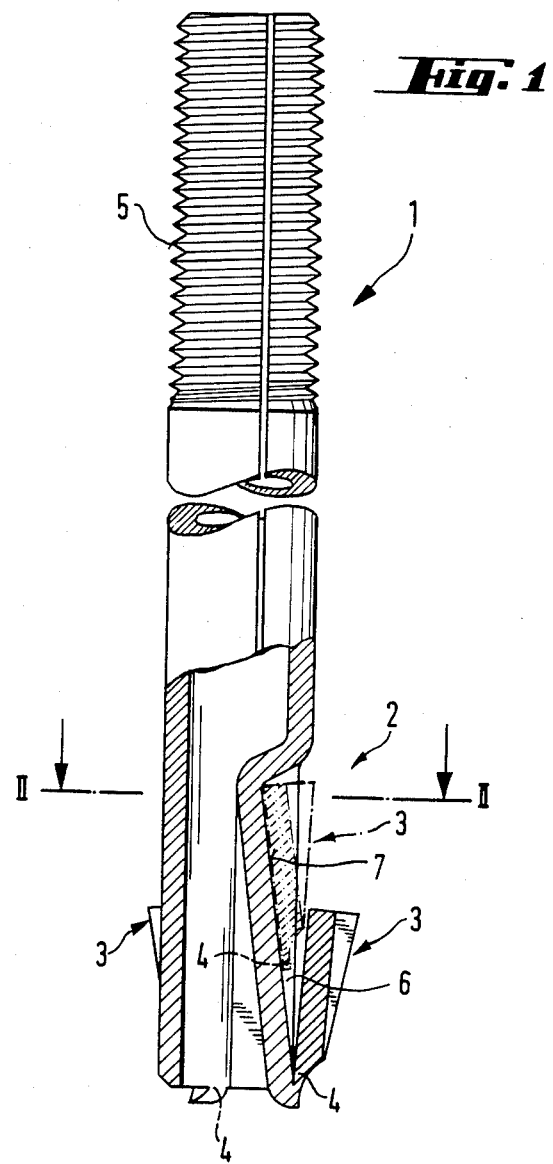
FIG. 1 is an elevational view, partly in section, of an expansion dowel assembly ready to be inserted into a borehole.
Figure 2:
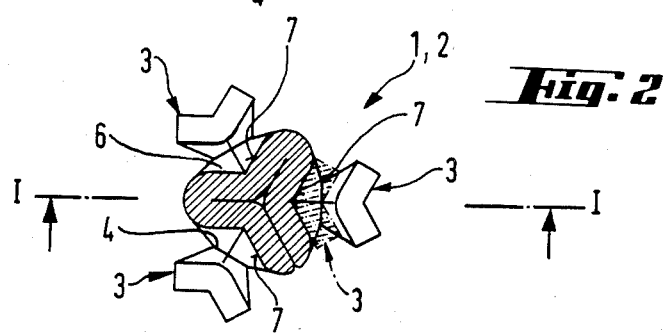
FIG. 2 is a sectional view of the expansion dowel assembly shown in FIG. 1 taken along the line II—II.

In FIG. 1 an expansion dowel assembly 1 is illustrated made up of a dowel body 2, wedge-shaped expansion members 3 and a web 4 connecting each of the expansion members to the dowel body. The dowel body 2 is an axially elongated tubular member with a generally cylindrically shaped exterior surface. As viewed in FIG. 1, the dowel body has a first or leading end at the lower end and a second or trailing end at the upper end, that is, when the dowel body is inserted into a borehole in a receiving material the lower or leading end is inserted first. The webs 4 connect the first end of the dowel body with the expansion members 3. The expansion members 3 extend from the first end toward the second end. The expansion dowel assembly 1 is formed monolithically from sheet metal as a die punch part. The generally tubular shaped dowel body 2 has means 5 in the form of an external thread extending from its second end toward the first end so that a load can be applied to the dowel body. In the region of the dowel body 2 extending from the first end toward the second end are three wedge-shaped recesses 6 equiangularly spaced around the circumferential periphery of the dowel body, note FIG. 2. The base 7 of the wedge-shaped recesses is inclined inwardly toward the axis of the dowel body from the first end toward the second end. The axial length of the recesses represents only a portion of the overal axial length of the dowel body.

The webs 4 have a reduced cross-section as compared to the thickness of the remaining dowel body material to facilitate severing or breaking the webs when an appropriate force is applied at the commencement of the dowel body insertion procedure. The expansion members 3 extending from the webs 4 have a V-shaped cross-sectional shape. Initially, as viewed in FIG. 1, the expansion members 3 project outwardly beyond the exterior surface of the dowel body 2. The V-shaped expansion members 3 are complementary to the V-shaped recesses 6 formed in the leading end region of the dowel body.

As viewed in FIG. 1, the expansion dowel assembly 1 is ready to be inserted into a borehole, not shown. The expansion members 3 project outwardly beyond the circumferential periphery at the leading end of the dowel body 2. As the dowel assembly is pressed into the borehole, the expansion members 3 at its leading or first end contact the opening into the borehole and are pivoted inwardly into the recesses 6 formed in the dowel body. As the dowel body is forced further into the borehole the webs 4 become severed or broken. As a result, the expansion members 3 are separated from the dowel body and can move relative to the dowel body toward the trailing end of the recesses 6, note the dash-dotted line in FIG. 1 indicating the position of the expansion member moved rearwardly away from the first end of the dowel body. In the rearward position, the expansion members 3 project only slightly beyond the circumferential periphery of the dowel body 2. With the dowel body 2 inserted for the desired depth into the borehole, when a load is applied on the exterior thread 5 at the second end of the dowel body, the expansion members 3 remain in position relative to the surface of the borehole while the dowel body tends to move in the direction opposite to the insertion direction, that is, out of the borehole. As a result, the base 7 of the recesses 6 inclined relative to the axis of the dowel body move relative to the expansion members and press the expansion members radially outwardly against the borehole surface so that the expansion dowel assembly 1 becomes anchored within the borehole.

While specific embodiments of the invention have been shown and described in detail to illustrate the application of the inventive principles, it will be understood that the invention may be embodied otherwise without departing from such principles.

I claim:

1. Expansion dowel assembly arranged to be anchored in a borehole in a receiving material comprises an axially elongated dowel body having a cylindrically shaped exterior surface with a first end and a second end spaced apart in the axial direction, at least one wedge-shaped expansion member having a first end and a second end spaced apart in the axial direction of said dowel body, means for applying a load to said dowel body located in the regior of the second end thereof, a wedge-shaped receess in the exterior surface of said dowel body located adjacent the first end thereeof for each said expansion member, said wedge-shaped recess has abase inclined to the axial direction of said dowel body with said base converging toward the dowel body axis in the direction from the first end toward the second end, said at least one expansion member being attached to said dowel body with the attachment being severable when said expansion dowel assembly is inserted into a borehole, wherein the improvement comprises a web forming the attachment of said at least one expansion member to said dowel body so that in the attached position before insertion into the borehole said expansion member protrudes laterally outwardly from the exterior surface of said dowel body adjacent the first end of said dowel body with said web directly attaching the first end of said expansion member to the first end of said dowel body, and said at least one expansion member is formed monolitically with said web and said dowel body, said expansion member being severable from said dowel body at said web at the first end of said dowel body.

2. Expansion dowel assembly, as set forth in claim 1, wherein the base of said recesses extend from the exterior surface of said dowel body at the first end thereof inwardly toward the axis of said dowel body in the direction toward the second end thereof.

3. Expansion dowel assembly, as set forth in claim 1, wherein said web is bendable.

4. Expansion dowel assembly, as set forth in claim 1, wherein three said recesses are arranged in the exterior surface of said dowel body equiangularly spaced about the dowel body axis, and three expansion members equiangularly spaced around and attached to the first end of said dowel body and each said expansion member arranged to fit into one of said recesses.

5. Expansion dowel assembly, as set forth in claim 4, wherein in cross-section extending transversely of the dowel body axis said recesses and said expansion members are V-shaped.

6. Expansion dowel assembly, as set forth in claim 4, wherein a separate said web secures each said expansion member to the first end of said dowel body, and said web has a reduced thickness as compared to the thickness of said dowel body so that said web can sever or break when said expansion dowel assembly is inserted into a borehole.

7. Expansion dowel assembly, as set forth in claim 1, wherein said web is bent approximately through 180° relative to said dowel body at the first end thereof so that said expansion member secured thereto extends from said web toward the second end of said dowel body.

* * * * *